US 7,209,489 B1

(12) United States Patent
Bailey et al.

(10) Patent No.: US 7,209,489 B1
(45) Date of Patent: Apr. 24, 2007

(54) ARRANGEMENT IN A CHANNEL ADAPTER FOR SERVICING WORK NOTIFICATIONS BASED ON LINK LAYER VIRTUAL LANE PROCESSING

(75) Inventors: Joseph A. Bailey, Austin, TX (US);
Joseph Winkles, Austin, TX (US);
Norman Hack, Pflugerville, TX (US);
Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1058 days.

(21) Appl. No.: 10/052,459

(22) Filed: Jan. 23, 2002

(51) Int. Cl.
*H04L 12/28* (2006.01)
*H04J 3/16* (2006.01)
*G06F 3/00* (2006.01)

(52) U.S. Cl. ................. 370/412; 370/469; 710/39; 710/40

(58) Field of Classification Search ............. 370/389, 370/412, 395.42, 395.41, 431, 444, 465–466, 370/469; 710/39, 52, 54, 40
See application file for complete search history.

(56) References Cited

U.S. PATENT DOCUMENTS

| 6,598,144 B1 * | 7/2003 | Bailey et al. ............... 711/203 |
| 6,912,604 B1 * | 6/2005 | Tzeng et al. ................ 710/52 |
| 2002/0150106 A1 * | 10/2002 | Kagan et al. ............. 370/395.6 |
| 2002/0165897 A1 * | 11/2002 | Kagan et al. ............... 709/102 |
| 2002/0165899 A1 * | 11/2002 | Kagan et al. ............... 709/104 |
| 2003/0035433 A1 * | 2/2003 | Craddock et al. ........... 370/429 |

OTHER PUBLICATIONS

Cassiday et al., "Hot Chips", *InfiniBand™ Architecture Tutorial*, Aug. 2000, pp. 1-79, InfiniBand™ Trade Association.
Hartmann, "Using The VIEO InfiniBand™ Channel Abstraction Layer (CAL)", *Channel Abstraction Layer (CAL)*, Jan. 2002, pp. 1-19, VIEO, Inc.

* cited by examiner

*Primary Examiner*—Huy D. Vu
*Assistant Examiner*—Nittaya Juntima
(74) *Attorney, Agent, or Firm*—Manelli Denison & Selter PLLC; Leon R. Turkevich

(57) ABSTRACT

A host channel adapter is configured for servicing received work notifications based on identifying the work notifications associated with the virtual lanes (VL) having a prescribed ordering position identified by the link layer operations. The host channel adapter, in response to receiving a work notification for a prescribed service level (SL), determines the virtual lane associated with the specified service level based on a prescribed service level to virtual lane mapping. If necessary (e.g., for an unreliable datagram service type), the work notification supplies the prescribed service level (SL) for the host channel adapter. The host channel adapter also determines an ordering position for the determined virtual lane from the link layer module, and selectively services the work notification based on the corresponding ordering position.

11 Claims, 4 Drawing Sheets

US 7,209,489 B1

ARRANGEMENT IN A CHANNEL ADAPTER FOR SERVICING WORK NOTIFICATIONS BASED ON LINK LAYER VIRTUAL LANE PROCESSING

BACKGROUND OF THE INVENTION

1. Field of the Invention

The present invention relates to a host channel adapter configured for communication with target channel adapters in an InfiniBand™ server system, and more particularly to the servicing by the host channel adapter of work notifications, also referred to as "doorbells", that notify the host channel adapter of work queue entries to be serviced.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, arbitrary hardware implementations may result in substantially costly or relatively inefficient hardware designs. One example involves the servicing of work notifications, also referred to as "doorbells". Doorbells are generated by verbs consumers (e.g., operating system supplied agents) that post a work request, for example a work queue entry (WQE) in system memory; the verbs consumer then sends the work notification to notify the host channel adapter of the work request in system memory.

Typically the host channel adapters are configured for servicing work notifications sequentially, using a first in first out arrangement. However, the link layer operations within the HCA are configured for transmitting InfiniBand™ packets according to virtual lane prioritization, for example a weighted round robin virtual lane prioritization. Hence, instances may arise where the host channel adapter may service work notifications for work requests associated with a virtual lane having a relatively low priority. Consequently, transport layer resources and link layer resources within the channel adapter are not coordinated relative to the link layer prioritization, resulting in inefficient utilization of resources. In addition, such uncoordinated operations between the transport layer resource and link layer resources limit the ability of the HCA transferring packet data for data streams (e.g., real time streaming data for video, voice, audio, etc.) according to Quality of Service policies preferred by the provider or consumer of the data streams.

SUMMARY OF THE INVENTION

There is a need for an arrangement that enables a host channel adapter to be implemented in an efficient and economical manner.

There also is a need for an arrangement that enables a host channel adapter to guarantee preferred Quality of Service policies for packet data flows output based on incoming work requests.

These and other needs are attained by the present invention, where a host channel adapter is configured for servicing received work notifications based on identifying the work notifications associated with the virtual lanes having a prescribed ordering position identified by the link layer operations. The host channel adapter, in response to receiving a work notification for a prescribed service level, determines the virtual lane associated with the specified service level based on a prescribed service level to virtual lane mapping. If necessary (e.g., for an unreliable datagram service type), the work notification supplies the prescribed service level for the host channel adapter. The host channel adapter also determines an ordering position for the determined virtual lane from the link layer module, and selectively services the work notification based on the corresponding ordering position.

Hence, the host channel adapter can coordinate servicing of multiple work notifications based on determining the respective ordering positions of the associated virtual lanes, for servicing the work notifications according to the order of transmission by the link layer module. Consequently, transport layer operations associated with servicing the work notifications can be coordinated with the link layer operations configured for sending data packets according to the virtual lane ordering.

One aspect of the present invention provides a method in a host channel adapter. The method includes receiving a work notification request for a specified service level, each specified service level associated with a prescribed virtual lane, and determining, from a link layer module, an ordering position for the prescribed virtual lane corresponding to the specified service level relative to other virtual lanes. The method also includes selectively servicing the work notification request based on the corresponding determined ordering position. Determining from the link layer module the ordering position for the prescribed virtual lane corresponding to the service level enables the host channel adapter to determine whether the work notification request is associated with a virtual lane requiring immediate servicing, for example a virtual lane currently being processed by the link layer module, or a virtual lane that does not require immediate servicing (e.g., a virtual lane having just been serviced within a prescribed sequence and that will not be serviced before other virtual lanes have been serviced). Hence, the selective service of the work notification request enables the host channel adapter to coordinate work notification processing resources with the link layer module resources, optimizing host channel adapter performance.

Another aspect of the present invention provides a host channel adapter. The host channel adapter includes a link layer module configured for selecting one of a plurality of virtual lanes, for data transfer, based on an identifiable ordering position. The host channel adapter also includes a transport layer module configured for receiving a work notification request for a specified service level. The transport layer module is configured for identifying the virtual lane and the corresponding ordering position associated with the specified service level, and selectively servicing the work notification request based on the ordering position for the identified virtual lane.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
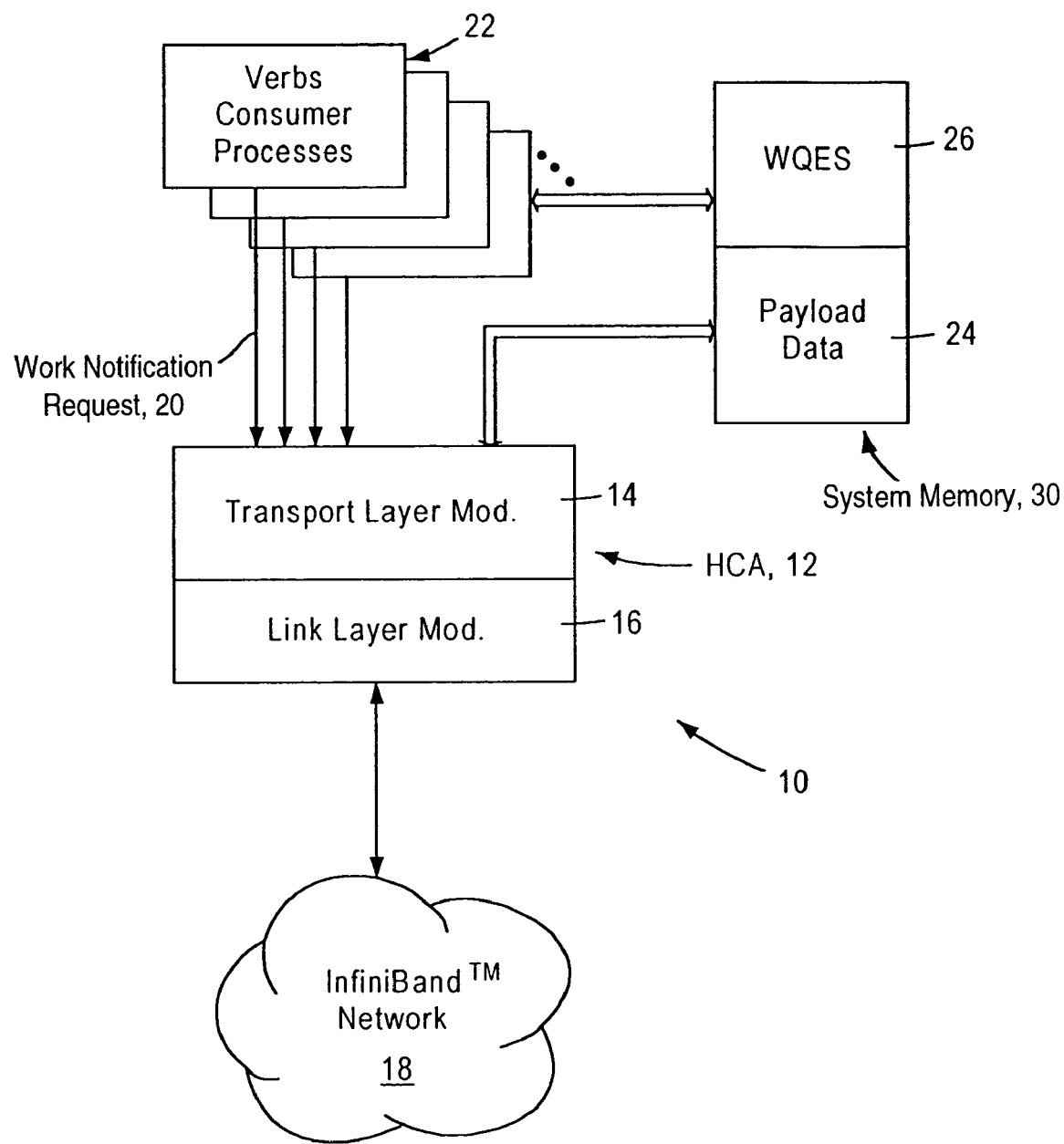
FIG. 1 is a diagram illustrating a host channel adapter configured for servicing work notification requests according to an embodiment of the present invention.

FIG. 1 is a block diagram illustrating a system 10 having a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including link layer flow control packet generation, link layer transmission credit checking, and other operations. Although this conventional type of implementation has the advantage of precisely following the network layers specified in the InfiniBand™ Architecture Specification, such an arrangement can result in uncoordinated operations between the transport layer and the link layer. Hence, there is a concern with unnecessarily wasting transport layer resources on low priority operations.

According to the disclosed embodiment, the HCA 12 includes a transport layer module 14 and a link layer module 16. The transport layer operations executed by the transport layer 14 are "prioritized" based on the order of servicing virtual lanes by the link layer module 16, ensuring that transport layer operations are coordinated with the servicing order utilized by the link layer module 16. In particular, the link layer module 16 is configured for selecting one of the virtual lanes for transfer of data via the IfiniBand™ network 18. The link layer module 16 selects a virtual lane for data transfer (e.g., outputting transmit data or receiving receive data) according to a prescribed ordering sequence, for example weighted round robin queuing, described below, where each virtual lane has an identifiable ordering position within the ordering sequence utilized by the link layer module 16.

The transport layer module 14 is configured for receiving work notification requests 20 from different verbs consumer resources 22. Each verbs consumer resource 22, in response to receiving a request for service that requires access to a resource via the InfiniBand™ network 18, generates and stores in a system memory 30 a data message 24 to be transferred by the InfiniBand™ network 18, and a work queue entry (WQE) 26. The WQE 26 specifies the corresponding data message 24, and also selectively specifies a service level based on the service type to be used. In particular, the InfiniBand™ Architecture Specification defines a service level (SL) attribute that permits a packet traversing the InfiniBand™ network to operate at one of sixteen available service levels.

The IfiniBand™ Architecture Specification defines five service types that can be used: Unreliable Datagram, Reliable Datagram, Unreliable Connection, Reliable Connection, and Raw Datagram. In the cases of the Reliable Datagram, the Unreliable Connection, and the Reliable Connection service types, the HCA 12 contains the Service Level of all WQEs posted to the respective send queues. However in the case of the Unreliable Datagram service type, the service level is contained in each WQE, not the HCA 12. Hence, typical HCA implementations would require a system memory fetch to retrieve the WQE before the HCA can determine the service level.

According to the disclosed embodiment, the verbs consumer resource 22 notifies the HCA 12 of the work queue entry 26 for an Unreliable Datagram service type by sending a work notification request 20 that specifies the assigned service level and the location of the corresponding WQE 26 in system memory 30. Since the HCA 12 may receive, for example, over a thousand work notification requests at any given time, the selective servicing of a given work notification request 20 by the transport layer module 14 enables the transport layer module 14 to coordinate transport layer operations with the link layer operations executed by the link layer module 16.

As described below, the transport layer module 14 maintains a service level/virtual lane mapping table that maps a service level specified by the verbs consumer 22 to a prescribed virtual lane maintained by the link layer module 16. In response to receiving a work notification request 20 that identifies a specified service level, the transport layer module 14 determines the corresponding virtual lane for the specified service level, and determines from the link layer module 16 the current ordering position identified for that virtual lane within the ordering sequence utilized by the link layer module 16. The ordering sequence may be a priority-based ordering sequence, where each ordering position is established by a priority-based arbitration; alternately, the ordering sequence may be arbitrary, where the ordering position is based on when the virtual lane was last serviced relative to the other virtual lanes. The transport layer module 14 can then selectively service the work notification request 20, for example selectively retrieving the WQE 26 from system memory 30 via DMA transfer, based on the corresponding determined ordering position for the corresponding virtual lane.

As described below, the ordering position (e.g., priority) for a given virtual lane may be based on identification of the current virtual lane being serviced by the link layer module 16, and the next virtual lane to be serviced by the link layer module 16; in this case, the transport layer module 14 can select to first service a first group of work notification requests 20 associated with the current virtual lane being serviced by the link layer module 16, followed by servicing a second group of work notification requests 20 associated with the next virtual lane to be serviced by the link layer module 16.

Figure 2:
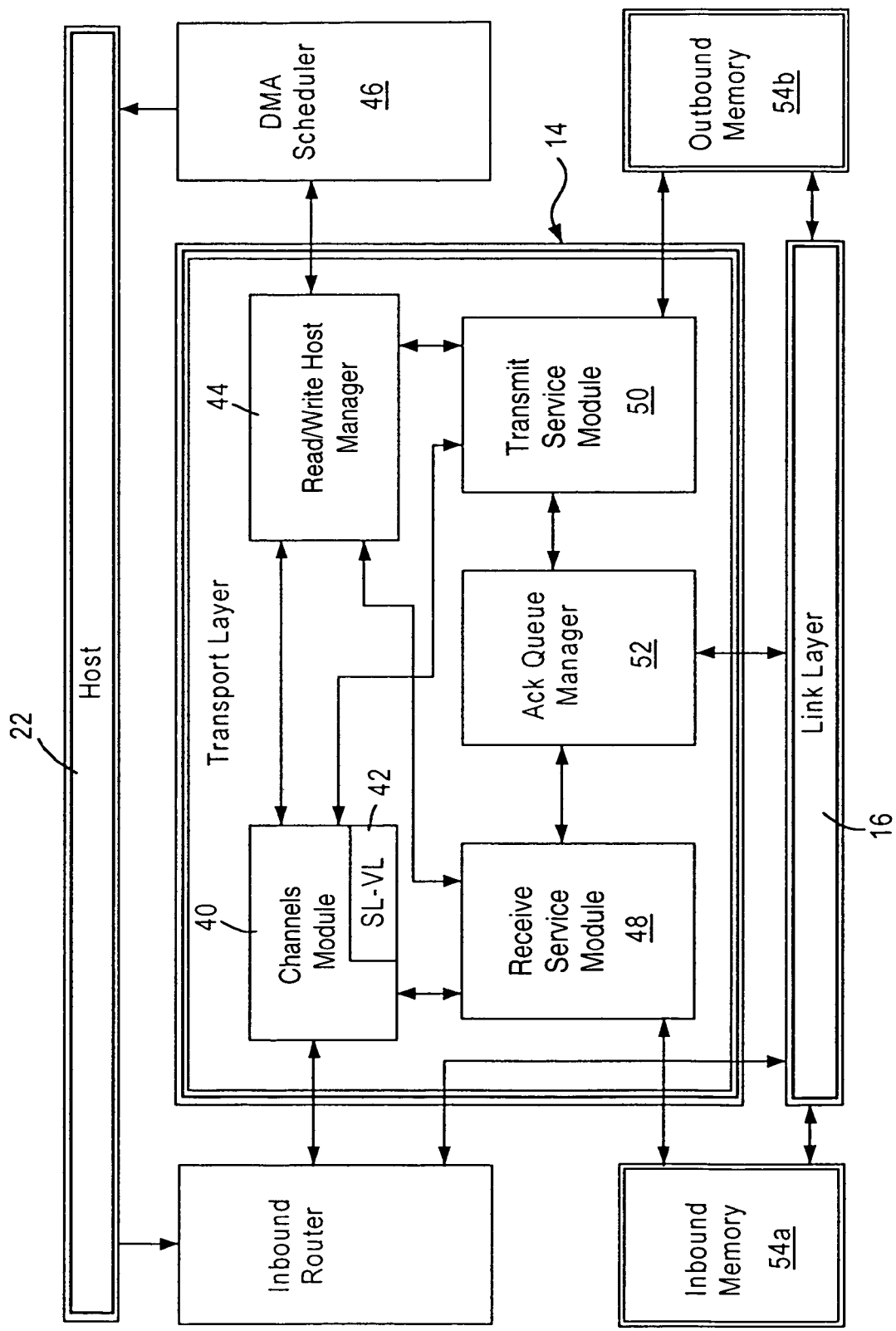
FIG. 2 is a diagram illustrating in detail the transport layer module of FIG. 1.

FIG. 2 is a block diagram illustrating in further detail the transport layer module 14 according to an embodiment of the present invention. The transport layer module 14 is configured for retrieving the WQEs 26 in response to the corresponding work notification requests 20 based on the determined priorities of the virtual lanes serviced by the link layer module 16, for construction of transport layer headers.

As shown in FIG. 2, the transport layer module 14 includes a channel module 40 having a service level to virtual lane mapping table 42, a read/write host manager 44 configured for managing read/write operations to and from the system memory 30 via a DMA scheduler 46, a receive service module 48, a transmit service module 50, and an acknowledgment queue manager 52. The HCA 12 also has local access to memory buffers 54a and 54b for storing receive data and transmit data, respectively.

The channels manager 40 is configured for managing transport services, including setup, management, and teardown of queue pairs. In particular, the channels manager is responsible for setup and teardown of transport connections: the communication management agent communicates with a subnet manager to establish the transport connections for the HCA 12.

The receive service module 48 is configured for determining whether a receive message includes application based data for a verbs consumer 22, transport service information for the channel manager 40, or an acknowledgment for the acknowledgment queue manager 52.

The transmit service module 50 is configured for generating the appropriate transport layer headers for the retrieved WQEs 26 based on the associated queue pair attributes. The transmit service module 50 also manages transmission of acknowledgments according to connection based requirements (e.g., reliable connection, reliable datagram) specified by the acknowledgment queue manager 52.

As described below with reference to FIG. 4, the read/write host manager 44 is configured for receiving a doorbell 20, and selectively servicing the doorbell 20 based on ordering position information (e.g., priority information) received from the link layer module 16 for the service level specified in the doorbell 20.

Figure 3:
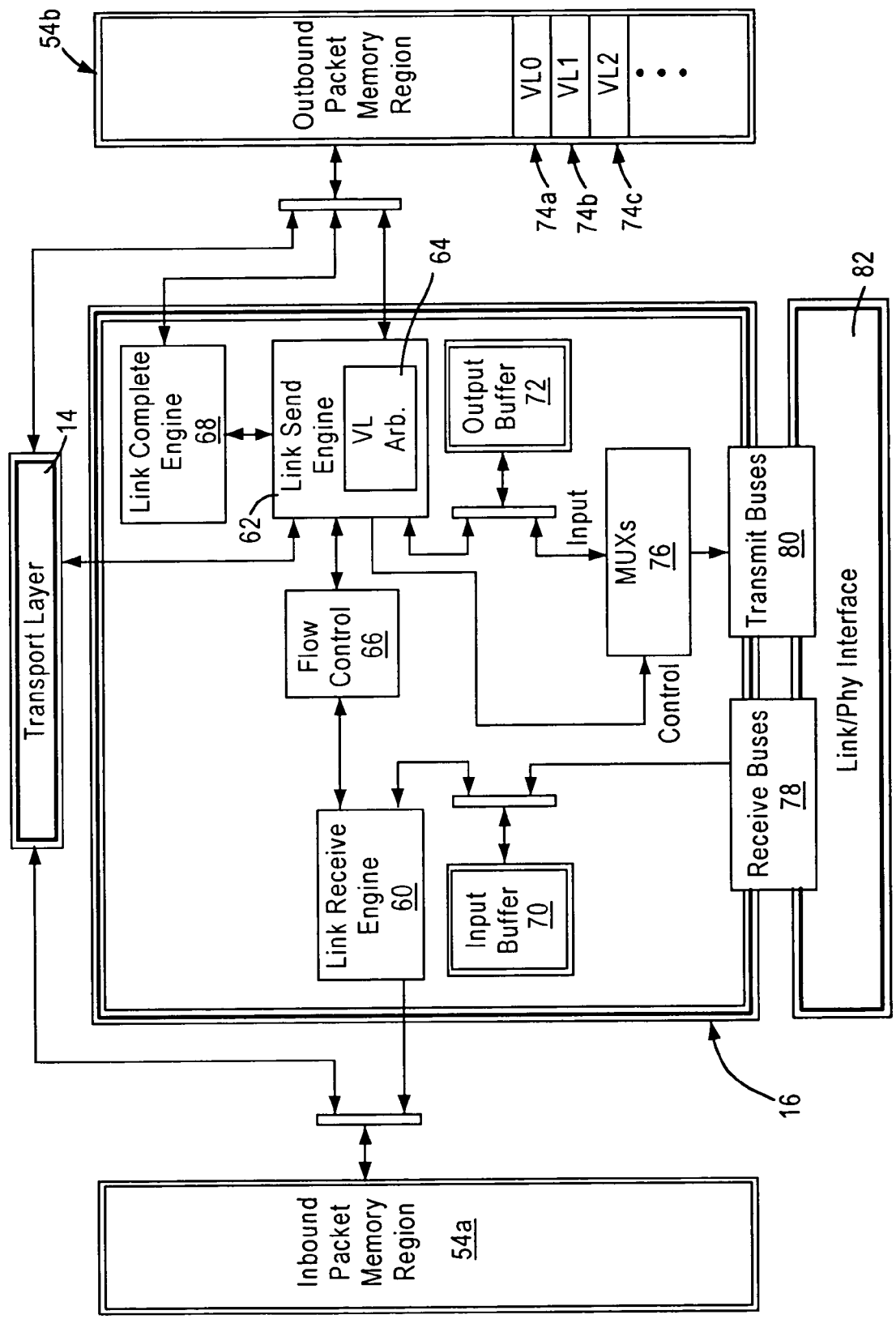
FIG. 3 is a diagram illustrating in detail the link layer module of FIG. 1.

FIG. 3 is a diagram illustrating in further detail the link layer module 16 according to an embodiment of the present invention. The link layer module 16 includes a link receive engine 60, a link send engine 62 having a virtual lane arbitration module 64, a flow control engine 66, and a link complete engine 68. The link layer module 16 also includes an input buffer 70, an output buffer 72, logical multiplexers 76, a receive bus 78, a transmit bus 80, and a link interface 82.

The link receive engine 60 is configured for managing link layer operations associated with receiving data packets, and the link send engine 62 is configured for managing link layer operations associated with transmitting data packets, according to the InfiniBand™ specification. The link send engine 62 also includes a virtual lane arbitration module 64 configured for performing virtual lane arbitration, for example weighted round robin arbitration. In particular, virtual lanes, defined in the InfiniBand™ Architecture Specification, enable multiple logical flows to be implemented over a single physical link, where link level flow control can be applied to one virtual lane without affecting other virtual lanes.

The link complete engine 68 is configured for preparing packets for transmission, for example by constructing a local routing header (LRH), calculating a cyclic redundancy check (CRC) value for the packet, and appending the LRH and CRC fields to the packets.

The VL arbitration module 64 is implemented as a state machine with registers, and is configured for managing the VL arbitration table (not shown) supplied by the host process 22, for servicing of the virtual lanes. The VL arbitration module 64 also determines which virtual lane to service, in what order, and for what duration (e.g., based on bandwidth considerations, internal buffer capacity, flow control credits or combination thereof). The establishment and tear down of virtual lanes is managed by the link complete engine 68.

The link layer module 16 outputs the transmit packets according to a credit-based flow control managed by the flow control module 66. In particular, the flow control module 66 monitors the available credits for transmission of a transmit packet on the assigned virtual lane. In particular, credits are sent on a per virtual lane basis, where a receiver issues a credit based on packets taken from an incoming virtual lane buffer; the credits are sent to the sender, enabling the sender to manage flow control. Hence, if the flow control module 66 determines that an identified virtual lane has an insufficient number of credits, the flow control module 66 sends an instruction to the link send engine 62 to defer transmission on the corresponding virtual lane until a sufficient number of credits have been received.

The output buffer 72 and the input buffer 70 each are implemented, for example, as first in first out (FIFO) buffers. The output buffer 72 is configured for buffering transmit data, including payload data retrieved from the outbound memory buffer 54b, following link layer processing by the link send engine 62. The outbound memory buffer 54b includes multiple internal buffers 74 assigned to the respective virtual lanes.

According to the InfiniBand™ Specification, the InfiniBand™ connection established by the link/PHY interface 82 may have up to 16 virtual lanes established for communications. Establishment of a virtual lane by the host 22 causes a new entry to be used for that virtual lane in a virtual lane arbitration table, supplied by the host 22 to the VL arbitration module 64. Use of a new virtual lane also results in a logical assignment of memory space 74 within the output memory buffer 54b. Hence, each virtual lane has its own assigned memory buffer 74 for storage of transmit data in the form of header and pointer information (for dynamic packet generation), or transmit packet data (for static packet transmission). The virtual lane arbitration module 64 monitors the relative capacities of the virtual lane buffers 74; hence, if a given buffer (e.g., 74a) for a virtual lane is about to encounter congestion conditions (i.e., a depletion of available memory space), the virtual lane arbitration module 64 may decide to change to another virtual lane for servicing to avoid the necessity of waiting for the congestion to clear.

Hence, the virtual lane arbitration module 64 monitors link parameters to determine which virtual lane should be serviced, and whether a given threshold for a prescribed metric necessitates switching to a different virtual lane due to limited resources. Such resources may include flow control credits, assigned bandwidth for the virtual lane, capacity of a given output buffer 74, etc. Hence, the VL arbitration module 64 notifies the link send engine 62 and the link complete engine 68 when to change virtual lanes, causing the link send engine 62 and the link complete engine 68 to select another buffer region 74 from the outbound memory region 54b.

The multiplexers 76, controlled by the link send engine 62, are used to select a link width of the port. In particular, the multiplexers 76 are used to enable selection of 1×, 4×, and 12× link widths according to the InfiniBand™ Specification.

Figure 4:
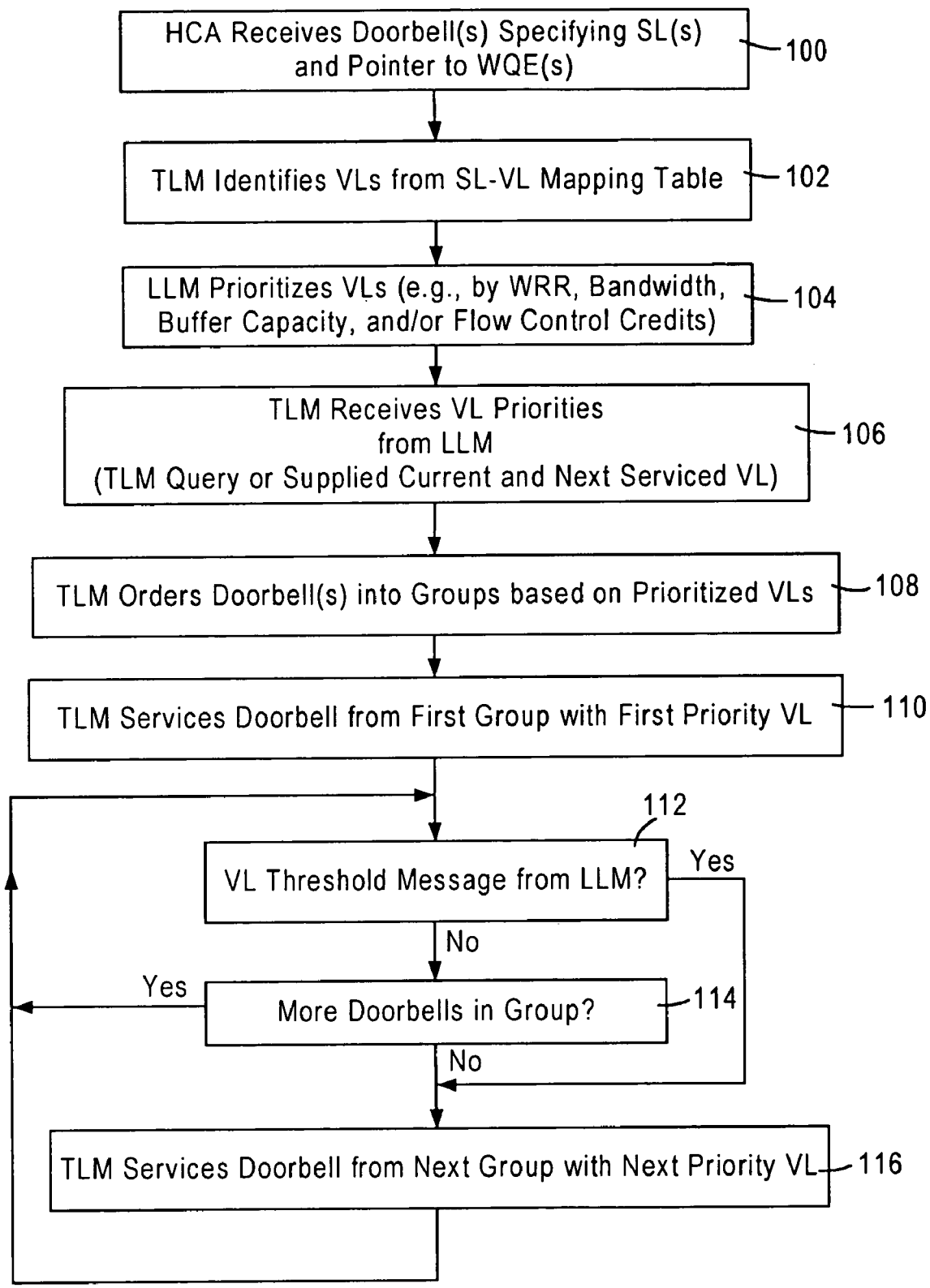
FIG. 4 is a diagram illustrating the method of selectively servicing work notification requests by the host channel adapter of FIG. 1, according to an embodiment of the present invention.

FIG. 4 is a flow diagram illustrating the method of servicing work notifications (i.e., doorbells) based on link layer virtual lane processing according to an embodiment of the present invention. The method begins in step 100, where the HCA 12 receives at least one doorbell 20 specifying a service level (for Unreliable Datagram service types) and a pointer to a WQE 26 stored in the system memory 30. As described above, however, typically the HCA 12 may receive on the order of one thousand doorbells at a given time, each specifying a pointer to the corresponding WQE 26, and a corresponding service level if the corresponding service type is an Unreliable Datagram.

The channels module 40 of the transport layer module (TLM) 14 identifies in step 102 the virtual lanes associated with the detected doorbells based on accessing the service level—virtual lane mapping table 42. Concurrent with the reception of the doorbells by the transport layer module 14, the virtual lane module 64 within the link layer module (LLM) 16 determines in step 104 the ordering sequence for servicing established virtual lanes (e.g., prioritizing the virtual lanes) using prescribed ordering techniques, for example weighted round robin, bandwidth utilization, monitoring of capacity in the respective buffers 74 and/or monitoring flow control credits managed by the flow control module 66. The description of the steps in FIG. 4 will be illustrated in terms of "prioritization" as an example of determining an ordering position from an ordering sequence, for simplicity.

The transport layer module 14 receives in step 106 the virtual lane ordering positions (e.g., priorities) for the link layer module 16, for example by issuing a query to the link layer module 16 for a specified virtual lane, or by receiving a stream of processing information from the link layer module 16 that specifies the current virtual lane being serviced and the next virtual lane to be serviced.

The read/write host 44 of the transport layer module 14 orders in step 108 the received doorbells into groups based on the determined ordering sequence (e.g., the prioritization of the virtual lanes). For example, if the virtual lanes arbitration module 64 currently is servicing virtual lane 0 (VL0) to be followed by virtual lane 4 (VL4), the R/W host 44 will identify the doorbells having service levels associated with VL0 as a first service group, and a doorbell having service levels associated with VL4 as a second service group.

The R/W host 44 begins servicing of the doorbells by first servicing in step 110 the doorbells from the first group associated with the first priority virtual lane (e.g., VL0). In particular, the R/W host 44 forms a DMA transfer using the DMA scheduler 46 to retrieve the WQE information 26 from the system memory 30; the transmit engine 50 generates the appropriate transport layer header, and stores the transport layer header and the pointer (supplied by the WQE 26) that identifies the system memory location of the payload data 24 into the outbound memory 54b. The link send engine 62 constructs the link layer packet by adding the appropriate link layer headers, and storing the information in the appropriate virtual lane output buffer 74.

The virtual lane arbitration module 64 monitors link layer resources to determine whether a prescribed resource threshold has been met, for example assigned bandwidth for a given virtual lane, depletion of flow control credits, or the reduction of available space within the virtual lane output buffer 74 to a prescribed amount. If necessary, the virtual lane arbitration module 64 changes the virtual lane being serviced, causing the link send engine 62 to send a virtual lane threshold message to the transport layer 14.

If in step 112 the transport layer module 14 receives a virtual lane threshold message from the link layer module 16, the transport layer begins to service doorbells from the next group having the next priority virtual lane in step 116, consistent with the change in priorities by the virtual lane arbitration module 64. If, however, there is no virtual lane threshold message received indicating a change in the virtual lane priorities, the transport layer module 14 continues servicing the doorbells from the existing group having the associated virtual lane assignment until the transport layer module 14 detects in step 114 that no more doorbells in that group need to be serviced.

According to the disclosed embodiment, transport layers operations are coordinated with link layer operations involving virtual lane arbitration to provide coordinated multilayer operations in a host channel adapter. Hence, the disclosed host channel adapter can provide efficient transport layer operations consistent with the requirements of the IfiniBand™ architecture specification.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:
   receiving a work notification request for a specified service level, each specified service level (SL) associated with a prescribed virtual lane (VL);
   determining from a link layer module an ordering position for the prescribed virtual lane corresponding to the specified service level relative to other virtual lanes; and
   in a transport layer module, selectively servicing the work notification request based on the corresponding determined ordering position, wherein the selectively servicing includes servicing the work notification request by retrieving a work queue entry from a prescribed location in system memory.

2. The method of claim 1, wherein:

the receiving step includes receiving a plurality of work notification requests, at least a portion of the work notification requests supplying the respective specified service levels, the service levels assigned to a plurality of the prescribed virtual lanes based on a prescribed mapping;

the determining step includes determining an ordering position for at least one of the prescribed virtual lanes; and the selectively servicing step including selecting a sequence for servicing the work notification requests based on the determined ordering position.

3. The method of claim 2, wherein the selectively servicing step includes first servicing a first group of the work notification requests associated with a first of the prescribed virtual lanes having a first ordering position, the first ordering position specifying the virtual lane currently serviced by the link layer module.

4. The method of claim 3, wherein the selectively servicing step further includes second servicing following the first servicing step, a second group of the work notification requests associated with a second of the prescribed virtual lanes having a second ordering position, based on at least one of completing servicing the first group and reaching a prescribed threshold associated with the first of the prescribed virtual lanes.

5. The method of claim 1, wherein the determining step includes receiving from the link layer module processing information specifying a current virtual lane being processed by the link layer module, the ordering position determined based on the processing information.

6. A host channel adapter comprising:

a link layer module configured for selecting one of a plurality of virtual lanes, for data transfer, based on an identifiable ordering position; and a transport layer module configured for receiving a work notification request for a specified service level, the transport layer module configured for identifying the virtual lane and the corresponding ordering position associated with the specified service level, and selectively servicing the work notification request based on the identified ordering position for the identified virtual lane, wherein the transport layer module is configured for servicing the work notification request by retrieving a work queue entry from a prescribed location in system memory.

7. The channel adapter of claim 6, wherein the transport layer module is configured for selecting for servicing from a plurality of received work notification requests, a first group of the received work notification requests for a service level associated with a first of the virtual lanes having a first ordering position at least a portion of the received work notification requests supplying the respective specified service levels.

8. The channel adapter of claim 7, wherein the transport layer module is configured for determining the first ordering position based on at least one of: identifying the first virtual lane as the one selected virtual lane; and the link layer module identifying the first ordering position for the first of the virtual lanes in response to a query from the transport layer module.

9. The channel adapter of claim 7, wherein the transport layer module is configured for selecting for servicing, following the first group, a second group of the received work notification requests specifying a service level associated with a second of the virtual lanes having a second ordering position, based on at least one of the transport layer module completing servicing the first group and the link layer module reaching a prescribed threshold associated with the first of the virtual lanes.

10. The method of claim 1, wherein the work notification request identifies the work queue entry stored in system memory.

11. The channel adapter of claim 6, wherein the work notification request identifies the work queue entry stored in system memory.

* * * * *